G. G. FORD.
AUTOMOBILE FENDER OPERATING MECHANISM.
APPLICATION FILED MAY 12, 1921.
1,437,098.
Patented Nov. 28, 1922.
2 SHEETS—SHEET 1.
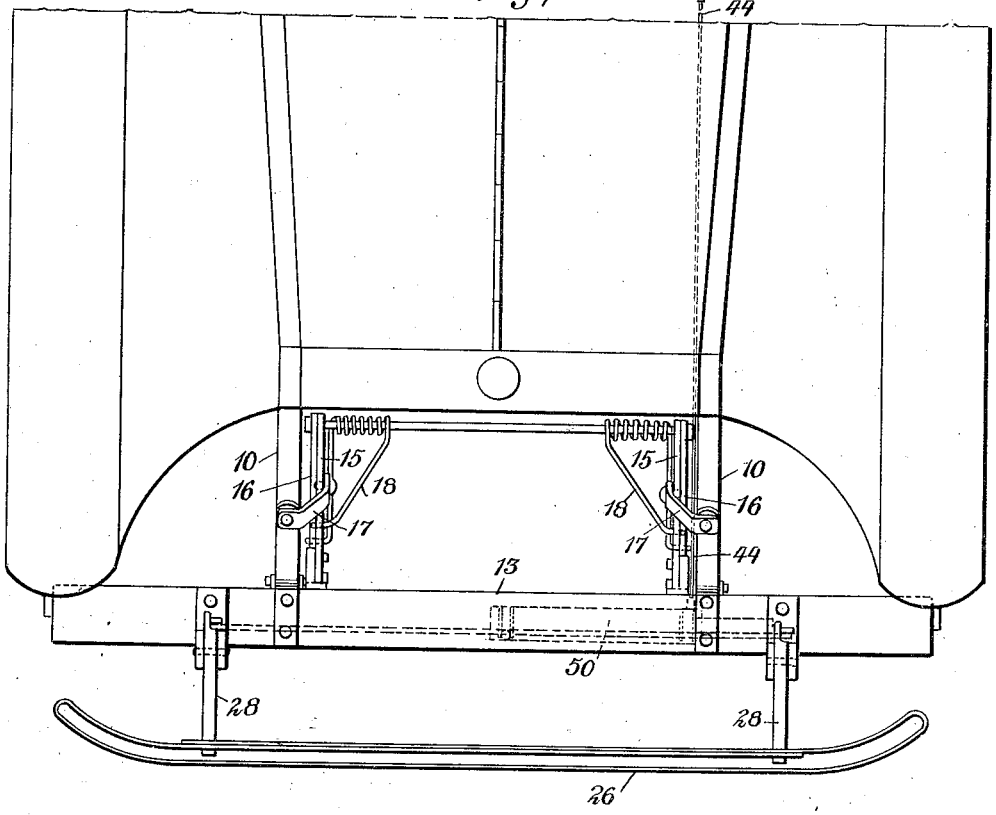
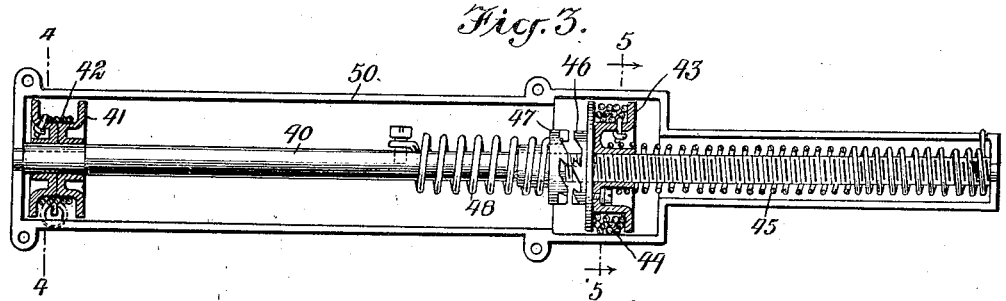
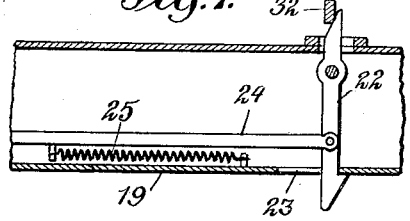 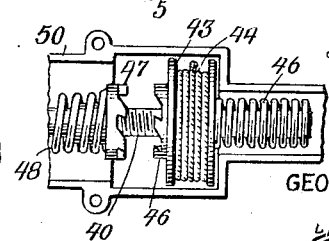
INVENTOR
GEORGE GAYNER FORD
ATTORNEY

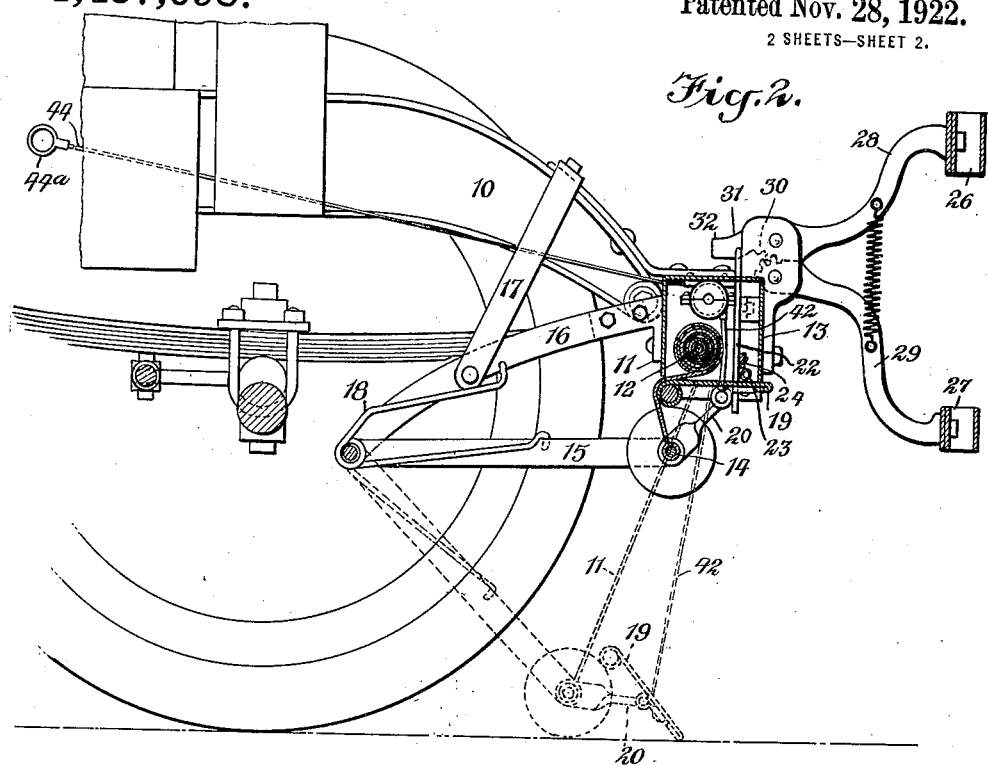
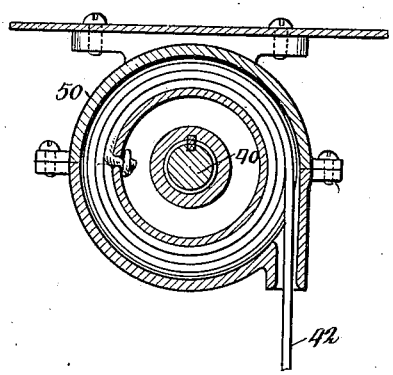
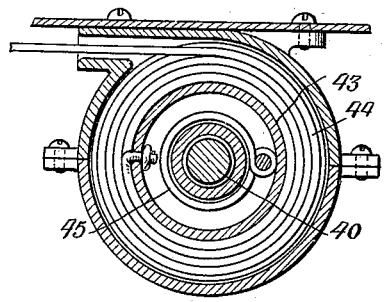

Patented Nov. 28, 1922.

1,437,098

UNITED STATES PATENT OFFICE.

GEORGE GAYNER FORD, OF BROOKLYN, NEW YORK, ASSIGNOR TO LOUIS STURMAN, OF NEW YORK, N. Y.

AUTOMOBILE FENDER-OPERATING MECHANISM.

Application filed May 12, 1921. Serial No. 468,880.

*To all whom it may concern:*

Be it known that I, GEORGE GAYNER FORD, a citizen of the United States, and resident of Brooklyn, in the county of Kings and State of New York, have invented certain new and useful Improvements in Automobile Fender-Operating Mechanisms, of which the following is a specification.

This invention relates to automobile fenders of that type in which the body of the fender is normally in a raised position so as to be free of the roadway, but adapted to be moved to a lower position in front of the car or the wheels thereof, to catch persons or objects and prevent their passing beneath the wheels or under the car. A construction of this general character is disclosed in Patent 1,185,327, issued May 30th, 1916, to Frederick E. Hutchings. In this construction there is employed a curtain which may be rolled up or unrolled, and a hand rail or bumper serving to operate a catch or releasing device to permit the lowering of the curtain when the hand rail or bumper is moved relatively of the frame of the vehicle.

My invention involves the means employed for raising the curtain or restoring other fender parts to normal position after the fender has been dropped either accidentally or in picking up a person or object. The main object of the invention is to provide simple and easily operated means within the convenient reach of the driver, so that the fender may be raised without the driver leaving his seat. In my improved construction there is provided a reel and flexible connections to the fender so that by rotating the reel the fender may be lifted, and in connection with this a suitable form of clutch and operating means is employed so that the dropping of the curtain may be accomplished without interference on the part of the means which is used for raising it.

In the accompanying drawings which illustrate one form of my invention,

Fig. 1 is a top plan view,

Fig. 2 is a central longitudinal section,

Fig. 3 is a detail of the curtain operating means,

Figs. 4 and 5 are transverse sections on the lines 4—4 and 5—5 respectively of Fig. 3, Fig. 6 is a detail similar to a portion of Fig. 3, but showing the parts in normal position, and Fig. 7 is a detail of the means for holding the curtain in normal raised position.

I have illustrated my invention in connection with a fender mounted on the side frame members 10 of the chassis of an automobile, and this fender includes a curtain 11 normally rolled on a reel 12, preferably enclosed and protected in a housing 13. This may be rigidly secured to the front ends of the frame members 10 in any suitable manner. The reel 12 has a coil spring which may be similar to that of an ordinary shade roller for rolling up the curtain when the lower end is raised. The lower end of the curtain is secured to a transverse rod 14 which is carried by arms 15 pivoted to stationary arms 16. The latter may be secured to the rear side of the casing 13 and may be held rigid with the chassis by braces 17. A spring 18, normally tends to force the arms 15 downwardly from the position shown in solid lines in Fig. 2 to the position shown in dotted lines, and thus lower the curtain to operating position. The rod 14 also preferably carries a shoe or plate 19 pivoted intermediate its front and rear edges to extensions 20 of the arms 15. These may be constructed similar to and serve the same function as the shoe or plate shown in the Hutchings Patent 1,133,287, issued March 30th, 1915. This shoe may serve as the bottom or closure plate of the casing 13 when the curtain is rolled up, as shown in solid lines in Fig. 2.

For holding the plate 19 in raised position, there are preferably provided pivoted catches 22 within the casing 13 each having a pointed end adapted to project through corresponding slots 23 in the plate 19. The catches which may be two in number may be connected together by a rod 24 so as to operate simultaneously and a coil spring 25 may normally tend to hold the catches in operating position. This rod ensures the simultaneous movement of the catches to retaining or releasing position.

The upper end of each catch 22 projects through the upper wall of the casing 13 and means are provided for engaging with these catches in case the vehicle collides with a person or object. As shown, two bumpers 26 and 27 are mounted in vertical spaced relationship on arms 28 and 29 which are pivoted to a bracket 30 on the casing 13. The pivot points of the two arms are spaced a short distance apart and the portions of the arms between the pivots are provided with a few meshing gear teeth so that as one bumper is raised, the other one is lowered and the simultaneous movement of the two is ensured. One of the arms, for instance the arm 28, is provided with an extension 32 having cam action on the upper end of the corresponding catch 22, so that as the bumper 26 is raised or the bumper 27 lowered, the projection 32 acts on the cam end of the catch 22 and the two catches are simultaneously released to permit the dropping of the fender. The mechanisms so far described in detail form no portion of my invention but are covered by a separate application Serial No. 540,793, filed March 3rd, 1922, by Frederick E. Hutchings, the inventor.

My invention is merely illustrated as being applied to this construction and serves for the quick and convenient raising of the curtain after it has dropped. My improved mechanism includes a shaft 40 mounted substantially parallel to the shaft 12 of the curtain and provided with a reel 41, rigidly secured thereto and disposed in a position substantially above the curtain at a point midway between the ends thereof. A cord 42 is wound on this reel and extends to the center point of the plate 19. The rotation of the shaft in one direction to wind up the cord on the reel 41 raises the plate 19 into the position shown in solid lines in Fig. 2, and against the action of the springs 18, while the shade roller spring of the curtain winds up the latter as fast as the arm 15 is raised. Mounted on the shaft 40 is a second reel 43 connected thereto by screw threads so that rotation of the reel in respect to the shaft 40 causes an endwise or traveling movement of the reel along the shaft. The cord 44, secured to and wound on this reel, extends back alongside the engine, and if desired, over suitable guiding pulleys to a point within the convenient reach of the driver. The reel 43 is spaced from the reel 41 so as to bring the former adjacent to the frame 10 of the vehicle, and thus the cord 44 may extend directly rearward from the reel and a substantially straight pull secured.

A coil spring 45 has one end held stationary and the other end secured to the reel 43, and the tension of this spring is such that the cord 44 is normally wound on the reel and kept substantially taut. At the same time the spring permits the rotation of the reel 43 through a plurality of turns in raising the curtain, and when the handle or other device 44$^a$ on the cord or cable 44 is released, the cord will be rewound.

For connecting the reel 43 to the shaft 40 for winding up the curtain and at the same time permit the independent rotation of the shaft 40 during the dropping of the curtain, I provide a clutch including a clutch collar 46 rigid with the reel 43 and a second clutch collar 47 mounted on the shaft. This clutch collar 47 may be rigid with the shaft, but preferably is connected to it by a comparatively heavy coil spring 48 which permits a limited rotary or endwise movement of the clutch in respect to the shaft, to cushion the action and ensure proper functioning of the parts. The normal position of the parts is substantially as shown in Fig. 6, that is, the clutch collars 46 and 47 are spaced some little distance apart, and both cords are wound up on their respective reels. When the fender is tripped and the curtain dropped the weight of the plate 19 and the action of the spring 18 will act to unroll the curtain and at the same time unwrap the cord 42 from the reel 41. This rotation of this reel and the corresponding rotation of the shaft 40 acts through the screw thread to move the reel 43 endwise without rotating it, and bringing the clutch collars closer together although possibly not into actual engagement. The position of the parts after the dropping of the curtain is substantially as shown in Fig. 3.

Now if the driver pull on the cord 44 he will rotate the reel 43 in respect to the shaft 40 and move the reel farther in the same direction as it was moving in during the dropping of the curtain. This will almost immediately bring the two clutch collars together, and further pulling on the cord 44 will cause the shaft 40 to rotate with the reel 43, and endwise movement of the reel 43 will thus terminate. The pulling of the cord 44 with the clutch collars in engagement and the resulting rotation of the shaft 40 winds up the cord 42 on the reel 41 and raises the curtain. This action is continued until the plate or shoe 19 comes into final position as a closure for the under side of the casing 13, and the catches 22 engage with the plate to hold it up. The driver then releases the tension on the cord 44 and the reel 43 begins rotating in the opposite direction under the action of the spring 45 until the cord 44 is wound up. This action does not result in any rotation of the shaft 40 but moves the reel endwise along the screw threads and separates the clutch members to the maximum position. It will be noted that the action is briefly as follows:

The dropping of the clutch rotates the shaft and brings the clutch members substantially together without rotating the reel 43. The rotation of the reel 43 coils up the spring 45, turns the shaft 40 and winds up the cord 42 without the endwise movement of the reel 43, and the releasing of the cord 44 permits the spring 45 to rotate the reel 43 on the shaft, separate the clutch members and rewind the cord 44. The raising mechanism thus does not interfere with the free dropping of the curtain, and the clutch members are always spaced apart when the curtain is raised. The dropping of the curtain puts the clutch members in such position that they may be conveniently operated to raise the curtain, and when the curtain is raised the parts are thereafter automatically restored to normal position by a spring 45 and screw threads.

I have illustrated the shaft 40 and its connected parts as being disposed within a casing 50 mounted inside of the casing 13. The casing 50 may be entirely omitted, but is preferably employed in order to keep the reels, screw threads and other parts free from dirt, and in good operating condition.

If desired, the compartment for the shaft may be formed by partitioning off the part of the casing 13, or the casing 50 may be mounted outside of or on the top of the casing 13.

I do not wish to be restricted to the specific form illustrated, as various other mechanisms might be provided within the scope of my invention as defined in the appended claims. The shaft 40 is shown separate and independent of the shaft 12 on which the curtain rolled. It will of course be evident that the reel 41 and cord 42 might be omitted in some constructions and the reel 43 and the clutch members mounted directly on the shaft 12 so as to positively wind up the curtain from the center rather than by lifting the lower edge of the curtain and letting the shade roller spring wind it up.

Having thus described my invention, what I claim as new and desire to secure by Letters Patent is:

1. A vehicle fender including a curtain normally rolled up, a shaft rotatable in one direction during rolling and in the opposite direction during unrolling of the curtain, a rotatable member, clutch connections between said member and said shaft and normally disengaged, and means for engaging the clutch to rotate the shaft from said member when the curtain is unrolled, disengaging the clutch when the curtain is rolled up, and holding it disengaged during the unrolling.

2. A vehicle fender including a curtain normally rolled up, a shaft rotatable in one direction during rolling, and in the opposite direction during unrolling, a reel, clutch connections between said reel and said shaft and normally disengaged, a flexible member normally wound on said reel and adapted for the rotation of the reel, means for engaging the clutch to rotate the shaft upon such rotation of the reel and when the curtain is unrolled, and means for disengaging the clutch when the curtain is rolled up and holding it disengaged during the unrolling.

3. A vehicle fender including a curtain normally rolled up, a shaft rotatable in one direction during rolling and in the opposite direction during unrolling of the curtain, a rotatable member threaded on said shaft, clutch connections between said member and said shaft and normally disengaged, said clutch members being brought together by the action of the screw thread during the unrolling of the curtain, means for rotating said member with the clutch engaged to roll up the curtain, and means for rotating the member in the opposite direction to separate the clutch members after the curtain is rolled up.

4. Lifting mechanism for vehicle fenders including a shaft rotatable in one direction during raising of the fender and in the opposite direction during lowering of the fender, a reel threaded on said shaft, means for holding it against rotation to effect the endwise movement of the member during lowering of the fender, means for rotating said member and the shaft to raise the fender, and means for rotating the member in the opposite direction to disengage the clutch after the fender has been raised.

5. A fender raising mechanism including a shaft, a reel having threaded connection therewith, clutch members connected to said reel and shaft, normally disengaged, means for holding the reel against rotation during the lowering of the fender and the rotation of the shaft, whereby the clutch members are brought into proximity, means for rotating the reel to engage the clutch and rotating the shaft to raise the fender, and means for rotating the reel in the opposite direction to separate the clutch members after the fender is raised.

6. A fender raising mechanism including a shaft, means for rotating the shaft in one direction during lowering of the fender, a reel having threaded engagement with the shaft, clutch members connected to said shaft and reel and normally disengaged, the rotation of the shaft during the lowering of the fender serving to bring said clutch members into proximity, a flexible member normally wound on said reel and serving to rotate the latter, engage the clutch, and rotate the shaft to raise the fender, and a coil spring for rotating the reel in the opposite direction and rewind said flexible member and disengage the clutch.

7. A fender raising mechanism including a shaft, an operating member threaded thereon, a clutch member secured to said operating member, a second clutch member, a spring engaging the latter and said shaft, means for rotating said operating member in one direction to engage the clutch and rotate the shaft, a coil spring for rotating the operating member in the opposite direction along the threads on the shaft to disengage the clutch.

8. A fender raising mechanism including a shaft, a pair of reels mounted thereon, one of said reels being rigid with the shaft and having flexible connections to the fender, the other of said reels being threaded on the shaft and having a flexible operating member, clutch connections between said shaft and said second mentioned reel, said clutch connections being brought into engagement by the rotation of the shaft during the lowering of the fender and the opposite rotation of the reel by said operating member, and a coil spring for rotating said second mentioned reel independently of the shaft to disengage the clutch connections and rewind the operating member.

9. A fender raising mechanism including a shaft rotatable in one direction during lowering of the fender and in the opposite direction during the raising of the fender, a reel on said shaft, a flexible operating member connected to and wound on said reel, clutch connections between said reel and said shaft, means for engaging the clutch connections when the fender is lowered and means for disengaging the clutch connections and rewinding the operating member on the reel after the fender is raised.

10. A fender raising mechanism including a pair of coaxial relatively rotatable reels, a flexible member secured to one reel and having its free end provided with a pull handle, a flexible member secured to the other reel and having its free end connected to the fender, each of said members being normally wound on its respective reel with the fender in raised position, connections between said reels whereby the lowering of the fender unwinds the second mentioned member, rotates its reel, and operatively connects the reels when the fender is in lowermost position, and whereby the pulling of the first mentioned member when the fender is in lowered position unwinds said member from its reel, rotates both reels to wind up the second mentioned member, and raise the fender, and means for rotating said last mentioned reel to wind its member thereon independently of any rotation of the other reel upon the release of said pull handle when the fender is in raised position.

11. A fender raising mechanism including a pair of coaxial reels having separate flexible members secured thereto and wound thereon, said reels being rotatable in opposite directions to effect the winding action of their respective flexible members, and clutch connections for operatively connecting said reels only when one or the other of said reels has been rotated to unwind its flexible member to the limiting extent.

12. A fender raising mechanism including a pair of coaxial reels having separate flexible members secured thereto and wound thereon, said reels being rotatable in opposite directions to effect the winding action of their respective flexible members, and means for operatively connecting said reels only when one or the other of said reels has been rotated to unwind its flexible member to the limiting extent.

13. A fender raising mechanism including a pair of reels, flexible members secured thereto and normally wound thereon, one of said flexible members having its free end provided with a pull handle and the other of said flexible members having its free end secured to said fender, said reels being rotatable in opposite directions to wind their respective flexible members thereon, and being independently rotatable when the said members are wound thereon, and means for operatively connecting said reels to rotate them simultaneously upon a relative rotation of said reels in opposite directions to an extent corresponding to the substantially complete unwinding of one of the members.

14. A fender raising mechanism including a pair of reels, flexible members secured thereto and normally wound thereon, one of said flexible members having its free end provided with a pull handle and the other of said flexible members having its free end secured to said fender, said reels being rotatable in opposite directions to wind their respective flexible members thereon, and being independently rotatable when the said members are wound thereon, and means for operatively connecting said reels to rotate them simultaneously to wind up one of said flexible members and raise the fender from lowermost position upon a pulling movement applied to the other flexible member.

15. A fender raising mechanism including a pair of reels, flexible members secured thereto and normally wound thereon, one of said flexible members having its free end provided with a pull handle and the other of said flexible members having its free end secured to said fender, said reels being rotatable in opposite directions to wind their respective flexible members thereon, and being independently rotatable when the said members are wound thereon, and means for operatively connecting said reels upon the lowering of the fender and the unwinding of one of said flexible members, whereby the fender may be raised and said flexible member rewound upon a pulling movement on the other flexible member.

Signed at New York, in the county of New York and State of New York, this 9th day of May, A. D. 1921.

GEORGE GAYNER FORD.